United States Patent
VanDenBerghe

(10) Patent No.: US 11,052,560 B2
(45) Date of Patent: *Jul. 6, 2021

(54) TAPE SYSTEM WITH A LONGITUDINAL FILAMENT FOR SLITTING FILM

(71) Applicant: 3M INNOVATIVE PROPERTIES COMPANY, St. Paul, MN (US)

(72) Inventor: Garry Cyrille Alfred VanDenBerghe, Coldstream (CA)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/095,162

(22) PCT Filed: Mar. 27, 2017

(86) PCT No.: PCT/IB2017/051743
§ 371 (c)(1),
(2) Date: Oct. 19, 2018

(87) PCT Pub. No.: WO2017/182899
PCT Pub. Date: Oct. 26, 2017

(65) Prior Publication Data
US 2019/0134834 A1    May 9, 2019

Related U.S. Application Data

(60) Provisional application No. 62/324,384, filed on Apr. 19, 2016.

(51) Int. Cl.
*B26D 1/547* (2006.01)
*B44C 1/10* (2006.01)
(Continued)

(52) U.S. Cl.
CPC ............ *B26D 1/5475* (2013.01); *B44C 1/105* (2013.01); *C09J 7/38* (2018.01); *C09J 201/02* (2013.01);
(Continued)

(58) Field of Classification Search
CPC .. B44C 1/105; C09J 201/02; C09J 7/38; C09J 2201/122; C09J 2201/128
See application file for complete search history.

(56) References Cited

U.S. PATENT DOCUMENTS

| 5,503,328 | A | * | 4/1996 | Roccaforte | ............ B65D 27/06 229/301 |
| 7,914,638 | B2 | * | 3/2011 | Van Den Berghe | ........................ B29C 63/0004 156/248 |

(Continued)

FOREIGN PATENT DOCUMENTS

| CN | 104231957 A | 12/2014 |
| WO | WO 2004/054793 A1 | 7/2004 |
| WO | WO 2011/009191 A1 | 1/2011 |

OTHER PUBLICATIONS

International Search report for PCT International Application No. PCT/IB2017/051743 dated Aug. 18, 2017, 6 pages.

*Primary Examiner* — Mark A Osele
*Assistant Examiner* — Christopher C Caillouet
(74) *Attorney, Agent, or Firm* — Vincent Pham

(57) ABSTRACT

A vehicle is wrapped by an adhesive film which is then slit by applying first tape to the vehicle having a longitudinally extending filament carried by the tape at a position spaced from the side edges. A second tape is applied over the film at the first tape body so as to bridge to each side of the filament and pulling the filament so as to tear through the film and the first ad second tapes body with the second tape applying a force to the film acting to reduce tendency of the (Continued)

film to pull away from the object during the cutting by the filament as the filament is pulled.

8 Claims, 3 Drawing Sheets

(51) Int. Cl.
  *C09J 7/38* (2018.01)
  *C09J 201/02* (2006.01)
(52) U.S. Cl.
  CPC .... *C09J 2301/122* (2020.08); *C09J 2301/124* (2020.08)

(56) References Cited

U.S. PATENT DOCUMENTS

| | | | |
|---|---|---|---|
| 8,361,615 B2 | 1/2013 | VanDenBerghe | |
| 9,751,232 B2* | 9/2017 | VanDenBerghe | ......... B32B 7/06 |
| 10,384,362 B2* | 8/2019 | VanDenBerghe | ....... B32B 27/08 |
| 2012/0094088 A1* | 4/2012 | Van Den Berghe | ..... C09J 7/201 |
| | | | 428/189 |
| 2015/0107763 A1* | 4/2015 | VanDenBerghe | ....... B32B 37/02 |
| | | | 156/248 |
| 2015/0367524 A1 | 12/2015 | VanDenBerghe | |

* cited by examiner

TAPE SYSTEM WITH A LONGITUDINAL FILAMENT FOR SLITTING FILM

CROSS REFERENCE TO RELATED APPLICATIONS

This application is a national stage filing under 35 U.S.C. 371 of PCT/IB2017/051743, filed Mar. 27, 2017, which claims the benefit of Provisional Application No. 62/324,384, filed Apr. 19, 2016, the disclosure of which is incorporated by reference in their entirety herein.

This invention relates to a tape system with a longitudinally extending filament or filaments used for slitting film or a coating.

This invention also relates to a tape with two longitudinally extending filaments and a method in use of the tape for slitting film or a coating.

The tape described herein is particularly but not exclusively designed for cutting an edge of a coating applied to a surface.

BACKGROUND OF THE INVENTION

Popular customization of vehicles in some cases involves the application of an adhesive film to the exterior surface of the vehicle. Such a film is readily available and is provided in sheets carrying a pressure sensitive adhesive covered by a release layer.

While the present application mentions specifically vehicles as an area where such films are used, it will be appreciated that many other uses of such self-adhesive films can be contemplated and are within the ambit of the present invention.

Some films are arranged to be printed with a required graphics to be applied to the vehicle and a number of patents of the present applicant describe the slitting of such films.

Another type of film which is often applied to vehicles is known as stone guard which applies a hard coating to the vehicle surface to prevent stone chips.

One issue which remains a difficulty is that of cutting the film at required locations so that the film terminates at the edge of a panel or at any other required location on the vehicle.

The Patents of the present Applicant provide an arrangement which satisfactorily cuts or slits the graphics film and has been widely adopted as a system for use in this field.

Some films such as the stone guard type product are more difficult to apply and are more difficult to slit when applied. Often these use a wetted surface of the vehicle to assist the application and to improve the adhesion when applied, but this makes slitting of the film more difficult so that the slit formed by a filament fails to provide the required clean effective cuts and can leave unacceptable jagged edges.

The arrangement described herein can also be used for cutting a coating.

SUMMARY OF THE INVENTION

It is one object of the invention to provide a tape system for slitting film or a coating.

According to the invention there is provided a tape system for cutting a film comprising:

a first tape body of an extensible material having a front surface, a rear surface, a first longitudinal side edge and a second longitudinal side edge;

the first tape body having an adhesive on the rear surface for attachment to an object;

the front surface of the first tape body being free from adhesive and having a release characteristic relative to pressure sensitive adhesive such that the pressure sensitive adhesive can be contacted onto the front surface of the tape and pulled away;

the first tape body having a longitudinally extending filament carried thereby;

a second tape body of an extensible material having a front surface, a rear surface, a second longitudinal side edge and a second longitudinal side edge;

the second tape body having an adhesive on the rear surface for attachment to the film when applied over the first tape body;

the second tape body having a width arranged such that the second tape body when applied over the film at the first tape body bridges to each side of the filament on the first tape body underneath the film;

wherein the filament and the second tape body are arranged such that the filament when pulled tears through the second tape body along the length of the second tape body at its position at the second tape body spaced from both side edges.

Preferably the filament comprises a metal wire which is as fine as possible to provide the best cutting action and therefore has preferably a diameter less than 0.005 inch or in the range 0.0025 to 0.005 inch.

Preferably the filament is attached to the first tape body at a position thereon spaced from both the first and second side edges which allows bending of the first tape body while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge. However the filament can be pulled from one edge provided it slits through the second tape which must bridge either side of the filament to hold the film down.

Thus preferably the filament and the first tape body are arranged such that, with the rear surface of the first tape body attached to the object, the filament when pulled tears through the first tape body along the length of the first tape body at its position on the first tape body spaced from both side edges rather than pulling out from one side edge of the tape body.

Preferably each tape body has a width less than 0.25 inches with the first tape often being as narrow as 0.125 inch and the second tape being wider and commonly as much as 0.25 inch.

Preferably the first tape body carries a single filament which is all that is required in this preferred method. However for other uses more than one filament can be included.

Preferably the filament is located in the adhesive on the rear surface. However as an alternative structure, the first tape body may have a first substrate layer overlying and laminated by an adhesive to a second substrate layer where the longitudinally extending filament is located between the first and second substrate layers.

Preferably the first and second tape bodies are formed of the same material which is of a character which allows the material to slit easily when the filament is pulled through.

Preferably the second tape body has a length so that an end thereof extends beyond the first tape body and a start edge of the film to engage the object and hold the film onto the object when the slitting action is started at one edge.

According to a second aspect of the invention there is provided a method for cutting a film when applied by an adhesive to an object comprising:

applying first tape body to the object;

the first tape body comprising an extensible material having a front surface, a rear surface, a first longitudinal side edge and a second longitudinal side edge;

the first tape body having an adhesive on the rear surface for attachment to the object;

the front surface of the first tape body being free from adhesive and having a release characteristic relative to the adhesive;

the first tape body having a longitudinally extending filament carried thereby;

applying a second tape body over the film at the first tape body so as to bridge to each side of the filament of the first tape body underneath the film;

the second tape body comprising an extensible material having a front surface, a rear surface, a second longitudinal side edge and a second longitudinal side edge;

the second tape body having an adhesive on the rear surface for attachment to the film;

and pulling the filament so as to tear through the film and the second tape body along the length of the second tape body at its position on the second tape body spaced from both side edges.

In this arrangement preferably the second tape body applies a force to the film acting to reduce tendency of the film to pull away from the object during the cutting by the filament as the filament is pulled. This reduces the tendency of the film to bunch up as the filament is pulled. Such bunching increases the loading on the filament temporarily which can cause it to break. While a very fine wire filament of less than 0.005 inch and preferably less than 0.003 inch is preferred to provide the best cutting action, this can only be used if the loads on the filament do not temporarily reach a level where the filament can break. Thus without the use of this hold down system, the filament must be thicker to tolerate the loads and the thicker filament reduces the quality of the cut line and leads to higher cutting forces.

The second tape tends to retain the film flat against the surface of the object so that the very fine filament acts to tear right at the surface without any ability to move side to side relative to the intended cut line on the film which can cause jagged side edges to the slit.

This method is particularly applicable to a film of the type such as stone guard films which are typically applied with an application of water to the object. This water temporarily reduces the tack of the adhesive allowing the film to be applied while being stretched and moved as required to be tailored to the contours of the surface. As the water is removed or dries out, the adhesive increases in action to apply a strong retention force necessary in the area where the stone guard film is applied. However this reduction in the tack of the adhesive of the film allows it to lift from the surface during the slitting action Preferably the second tape body is laid so as to extend beyond an end of the first tape body and an edge of the film to engage the object and hold the film onto the object during the start of the cutting action.

According to a further aspect of the invention there is provided a method for cutting a film when applied by an adhesive to an object comprising:

applying tape body to the object;

the tape body comprising an extensible material having a front surface, a rear surface, a first longitudinal side edge and a second longitudinal side edge;

the tape body having an adhesive on the rear surface for attachment to the object;

the front surface of the tape body being free from adhesive and having a release characteristic relative to the adhesive;

pulling the filament so as to tear through the film;

and applying a force to the film acting to reduce tendency of the film to pull away from the object during the cutting by the filament as the filament is pulled.

In some preferred arrangements the filament is arranged at a distance from both side edges which allows bending of the tape while the tape remains flat in a first side to side direction by extension of the tape along the second longitudinal side edge relative to the filament and to the first longitudinal side edge and in a second side to side direction by extension of the tape along the first longitudinal side edge relative to the filament and to the second longitudinal side edge. However a tape with the filament attached at one edge can also be used In this arrangement preferably the filament and the tape body are arranged such that, with the rear surface of the second substrate layer attached to the object, the filament when pulled tears through the first substrate layer of the tape body along the length of the tape body at its position on the tape body spaced from both side edges so as to leave on one side of the position a first portion of the first substrate layer including the first side edge which remains attached to the second substrate layer and so as to leave on an opposite side of the position a second portion of the first substrate layer including the second side edge which remains attached to the second substrate layer, rather than pulling out from one side edge of the tape body.

Typically the adhesive on the tape has the characteristic that the tape body can be pulled from a surface of the object without leaving an adhesive residue and without damaging the surface.

The filament is carried in or on the adhesive on the rear surface. In this case, the adhesive is arranged to hold the filament in place on the tape during bending of the tape while the tape is applied to the surface and while the filament is being pulled to effect the cutting of the film. In this case, the filament when carried on the adhesive has a coating material compatible with the adhesive for generating an improved adhesion between the filament and the adhesive.

In an alternative arrangement, the adhesive is applied onto the substrate over the filament to hold the filament against the surface of the substrate.

As the filament is spaced from the first and second side edges and the tape has a width arranged such that the filament tears through the tape along the length of the tape, when pulled to cut the film, rather than pulling from one side edge of the tape, the tearing of the tape leaves a portion of the tape along the first side edge underneath the edge of the film which is removed after the film is cut and the edge laid flat on the surface. In this case, preferably the tape is colored to visually distinguish the portion of the tape from the film.

In some cases a primer is applied to the surface at least underneath the tape for increased attachment of the edge of the film to the surface and the adhesive of the tape preferably has the characteristic that the tape can be pulled from the primer on the surface of the object without leaving a residue of the adhesive and without damaging the primer surface.

Preferably the tape is formed of a plastics material allowing stretch of the tape greater than that of the filament. Preferably the tape is formed of a PVC. Preferably the pressure sensitive adhesive on the tape is rubber based as this can provide the required properties of adhesion and subsequent removal of the tape.

Preferably the tape carries a release coating on the front surface having a release characteristic relative to the pressure sensitive adhesive on the film such that the pressure sensitive adhesive on the film can be contacted onto the front surface of the tape and pulled away for repositioning without dislodging the tape from the object.

The tape can be used in a method which can include printing onto a second opposed surface of the film a pattern to be wrapped onto the object so as to apply the pattern around a part of the object and over the panel.

The tape can be used in a method which can be used to apply various types of film such as vinyl to vehicles. This can include large sheets or panels which are used to wrap or can include stripe packages that also require cutting. Some vehicles have reflective vinyl striping down both sides, so the stripe must be cut around the wheel wells, door handles and the like. Pinstripes on cars, trucks etc, also require cutting and again this application would alleviate the use of a knife. All applications can be done using various types of vinyl, perhaps printed or unprinted.

The tape may include a substrate with the adhesive applied to one surface of the substrate, or the tape may comprise simply an adhesive material with the filament attached thereto or embedded therein.

The filament can be formed of any suitable material which has sufficient strength to carry out the cutting action when pulled without breaking and a sufficient cutting action to effect cutting and not tearing the film. Metal wire is typically suitable. Other materials such as carbon fiber or Kevlar fiber can be used.

Preferably the tape has a width less than 0.25 inches so that the bare piece or strip at the edge of the panel and at the edge of the adjacent portion is as narrow as possible.

The absence of adhesive on the front surface of the tape can be used to allow the film position to be adjusted on the panel and on the object so that it is properly placed and located without creases or folds or bubbles while aligning printed images from different sheets as required. Thus the pressure sensitive adhesive on the film itself is used to attach the film to all locations and the release coating is of a character that the film can be pulled back and re-located when required without dislodging the tape from the object.

Films of this type are available with a release layer from suppliers such as 3M and can be printed with the pattern at the place of application using designs supplied by a customer.

The object is typically a vehicle or boat or other transportation device including automobiles, vans, buses and the like. In this case the panel is typically a door or trunk lid.

The area to be left uncovered can be any area of a surface of the object such as a door handle, gas filler cap or the like. In this case the whole surface of the vehicle or other object is to be covered but includes such areas which cannot be covered without interfering with the operation.

However other objects can be covered where the problem of doors or other panels and the problem of areas to be left uncovered is to be resolved using the above invention. The film typically wraps around at least a side of the vehicle where the hinged panel is a door and around a rear of the vehicle where a second hinged panel is provided and covered using the invention.

According to a further aspect of the invention there is provided a tape comprising: a tape body having a front surface, a rear surface, a first longitudinal side edge and a second longitudinal side edge;

the tape body having an adhesive on the rear surface for attachment to an object;

the tape body having a first and a second longitudinally extending filaments attached thereto;

wherein the first and second filaments are attached to the tape body at a position thereon spaced from both side edges of the tape to a distance which allows bending of the tape in a first side to side direction by extension of the tape along the second longitudinal side edge and in a second side to side direction by extension of the tape along the first longitudinal side edge.

Preferably the first and second filaments are side by side. That is they are preferably immediately side by side so as to confirm that the second filament when pulled passes through the same slot formed by the first filament. However they may be slightly spaced.

Preferably the first and second filaments are arranged such that the first filament when pulled tears through the tape to form a slot which divides the tape body into two separate longitudinally extending, side by side pieces.

Preferably the first and second filaments are arranged such that the second filament when pulled passes through the slot.

Preferably the tape body has an adhesive for holding the masking sheet on at least part of the width of the front surface thereof, that at least on a side of the first filament adjacent the second filament. However the masking sheet may be self-adhesive Preferably the filament and the tape body are arranged such that, with the rear surface attached to the object, the first filament when pulled is pulled from the tape body along the length of the tape body at its position thereon rather than pulling out from one side edge of the tape body.

Preferably the adhesive has the characteristic that the tape body can be pulled from a surface of the object without leaving an adhesive residue and without damaging the surface.

Preferably the filaments are less extendible than the tape body to allow extension of the edges only during the bending action.

Preferably the first and second filaments are carried in or on the adhesive on the rear surface. However other arrangements' can be used where for example the first filament is carried in or on the adhesive on the rear surface and the second filament is on the side of the tape body opposite to the first filament.

Preferably the tape body consists of a single layer.

Preferably the tape body carries only the first and second filaments.

Preferably the first and second filaments are located substantially at a center line of the tape body.

Preferably one or both of the first and second filaments have a coating thereon which prevent them from adhesively connecting together when the first filament is pulled.

Preferably one or both of the first and second filaments have a coating thereon or are arranged in the tape structure in a manner which allows the first filament to be pulled out more easily than the second without pulling the second filament with it.

Preferably the second filament is stronger than the first to cut through the coating.

Preferably the tape is free from adhesive on the front surface.

Preferably the tape is arranged for the front surface to stick to an adhesive sheet covering the tape as a masking sheet.

According to a further aspect of the invention there is provided a method of applying a film or coating to a surface comprising:

providing a tape comprising:

a tape body having a front surface, a rear surface, a first longitudinal side edge and a second longitudinal side edge;

the tape body having an adhesive on the rear surface for attachment to the surface;

the tape body having a first and a second longitudinally extending filaments attached thereto;

wherein the first and second filaments are attached to the tape body at a position thereon spaced from both side edges of the tape to a distance which allows bending of the tape in a first side to side direction by extension of the tape along the second longitudinal side edge and in a second side to side direction by extension of the tape along the first longitudinal side edge;

pulling the first filament so that the first filament tears through the tape body to form a slot which divides the tape body into first and second separate longitudinally extending, side by side pieces and so that the first filament tears through the masking sheet;

removing from the surface the first piece of the tape body on the side of the slot opposite the second filament;

applying the coating or film to the surface up to and beyond the slot so that a part of the coating or film extends over the remaining piece of the tape;

pulling the second filament from the remaining piece of the tape to cut the coating or film;

and removing the second piece of the tape body and the coating or film beyond the cut thereon to leave the coating or film on the surface.

Preferably the filament is pulled around the edge of the remaining piece of the tape at the location of the slot.

This method may be used for film or may be used for a coating. In the coating method there may also be included a masking sheet at the tape onto which the coating is applied so that the unwanted portion of the coating is pulled away with the masking sheet. When used with self-adhesive film, the portion of the film left over the remaining piece of the tape is pulled away with that remaining piece.

Preferably wherein the tape body has on at least part of the width of the front surface thereof on a side of the first filament adjacent the second filament an adhesive onto which the masking sheet is applied. In most cases the adhesive will cover the whole front face of the tape but this is not necessary as long as the masking sheet remains held in place after it is cut by pulling of the first filament.

Preferably the filaments are less extendible than the tape body.

Preferably the first and second filaments are carried in or on the adhesive on the rear surface.

Preferably the first filament is carried in or on the adhesive on the rear surface and the second filament is on the side of the tape body opposite to the first filament.

Preferably the filament and the tape body are arranged such that, with the rear surface attached to the object, the filament when pulled tears through either the entire thickness of the tape body or through a part only of the thickness along the length of the tape body, rather than pulling out from one side edge of the tape body.

Typically the adhesive has the characteristic that the tape body can be pulled from a surface of the object without leaving an adhesive residue and without damaging the surface.

Preferably the tape body carries a single filament.

Preferably the filament is carried in or on the adhesive on the rear surface. In this case, the adhesive is arranged to hold the filament in place on the tape during bending of the tape while the tape is applied to the surface and while the filament is being pulled to effect the cutting of the film. In this case, the filament when carried on the adhesive has a coating material compatible with the adhesive for generating an improved adhesion between the filament and the adhesive.

In an alternative arrangement, the adhesive is applied onto the substrate over the filament to hold the filament against the surface of the substrate.

Preferably one or both of the first and second filaments have a coating thereon which prevent them from adhesively connecting together when the first filament is pulled.

Preferably one or both of the first and second filaments have a coating thereon allows the first filament to be pulled out more easily than the second.

Preferably the second filament is stronger than the first to cut through the coating.

Preferably the tape is free from adhesive on the front surface.

Preferably the masking sheet is adhesive for attachment to the surface and to the front surface of the tape.

Preferably the tape is formed of a plastics material allowing stretch of the tape greater than that of the filament. Preferably the tape is formed of a PVC. Preferably the pressure sensitive adhesive on the tape is rubber based as this can provide the required properties of adhesion and subsequent removal of the tape.

In accordance with another feature the tape may comprise a laminate of a first substrate carrying the adhesive on a rear surface thereof and a second substrate carrying a release layer on a front surface thereof with the filament located between the first and second substrates.

The tape can be used in a method which can include printing onto a second opposed surface of the film a pattern to be wrapped onto the object so as to apply the pattern around a part of the object and over the panel.

The tape can be used in a method which can be used to apply various types of coatings to surfaces such as vehicles. The invention is not limited to any type of coating or to any type of surface onto which it is applied. This can be used with thin coatings such as paint or with thicker coatings such as polyurethane or with even thicker coatings such as insulation. The surface can be of a movable object such as a vehicle or any static surface such as a wall of a building. No limitation as to the type of coating or type of surface should be implied herein.

The tape may include a substrate with the adhesive applied to one surface of the substrate, or the tape may comprise simply an adhesive material with the filament attached thereto or embedded therein.

The filament can be formed of any suitable material which has sufficient strength to carry out the cutting action when pulled without breaking and a sufficient cutting action to effect cutting and not tearing the coating. Metal wire is typically suitable. Other materials such as carbon fiber or Kevlar fiber can be used. MOPP (mono-axially oriented polypropylene) is preferred.

The use of the double filament arrangement allows the tape to be bent or curved side to side for contouring during application while allowing the unwanted part of the tape and the masking sheet to be cut away and removed before the coating is applied. Thus the coating is applied directly to the surface without any intervening elements which would interfere with the adhesion of the coating to the surface.

The tape body can be formed of a paper product which can stretch such as crepe paper or from a plastics material such as polyethylene. A stretch of up to 300% is desirable to provide suitable curvatures. No cutting of the tape is required to form any required curvature. The masking tape can bridge over the tape or can be applied onto the tape.

However it is not necessary to carefully locate the edge since it can be located at any location on the surface as it will be cut away and removed from the unwanted locations before the coating is applied.

It is necessary that the masking sheet be attached to the front surface of the tape. Typically this is done by providing an adhesive on the front face of the tape. However other methods may be used. For example the sheet may itself be adhesive and the front face of the tape is not adhesive but it not of a release characteristic. Thus the front face may be merely benign in that it attaches to adhesive. It may also include a layer which promotes adhesion to the adhesive on the masking sheet. In this case a release sheet may be required on this surface or on the rear surface covering the rear adhesive to prevent connection between the front and rear surfaces when wound onto a supply spool. Avoiding adhesive on the front surface simplifies the product and avoids unintended adhesion between the front surface and other elements such as other parts of the tape and other elements in the area of the work.

BRIEF DESCRIPTION OF THE DRAWINGS

One embodiment of the invention will now be described in conjunction with the accompanying drawings in which:

FIGS. 1 to 6 show cross sectional views through a first embodiment of tape for use in the present invention and showing a series of different steps in the method.

DETAILED DESCRIPTION

The method of the present invention uses the tape and concepts disclosed in for example U.S. Pat. No. 8,361,615 issued Jan. 29 2013 and assigned to the present Applicant, the disclosures of which are incorporated herein by reference or may be referenced for further details of the tape and concepts.

In that patent shown a vehicle, such as a panel van, including a side panel with a door and a rear panel and including hinged panel 14 in the form of a pair of rear doors 14A and 14B.

It is intended that a film should be wrapped around the vehicles to cover parts of the vehicle, particularly where stone chips may occur. The film can be supplied as a single sheet but typically will be formed in smaller sheets which are butted edge to edge or slightly overlapping to cover as much of the vehicle as is required.

The vehicle includes a number of hinged panels such as doors, trunk lid and hood which can move from a closed position in which an edge of the panel abuts an adjacent edge portion of the vehicle.

Typically as the sheet is supplied in flat form and the vehicle surface is extensively contoured, it is necessary to pull and stretch the film to fit the surface. This typically includes, in extreme locations, the application of heat from a heat gun to the sheet 18 and generally includes the repeated steps of pulling the sheet, applying it temporarily over the surface, removing the sheet for further pulling and reapplying the sheet until it is applied in a contour fit condition against the vehicle with no bubbles.

Figure 1:
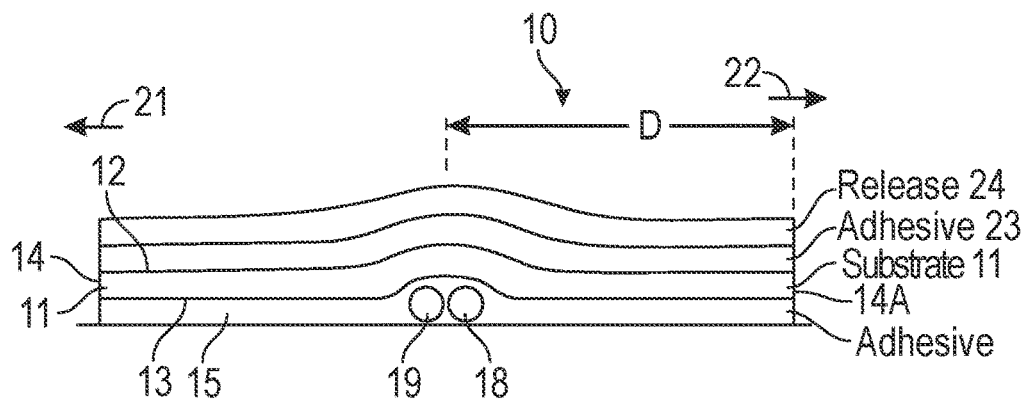
FIG. 1 is a cross sectional view through one embodiments of tape system for use in the present invention.

In order to effect cutting of the film at the edges and there is provided a tape 10 shown in FIG. 1 having a front surface 11, a rear surface 12, a first longitudinal side edge 13 and a second longitudinal side edge 14. The tape has an adhesive layer 15 on the rear surface 12 for attachment to the object. The tape 10 is free from adhesive on the front surface 11 which instead has a release characteristic allowing it to release from or to repel adhesive such as the adhesive 9 on the sheet 8. This release characteristic is typically provided by an actual coating but can be provided by the characteristics of the substrate itself or by a co-extruded layer on the substrate. The release coating is not intended to be removed and is not therefore a removable peel away sheet. The tape 10 carries a filament 16.

The filament 16 can be located along one longitudinal side edge 13 or 14 but preferably is located along a line part way or mid way across the tape spaced from both the first and second longitudinal side edges.

In FIG. 1, the filament is simply applied onto the adhesive layer 15 and is attached thereto. Thus the filament can be simply attached to a pre-existing tape. Typically the thickness of the tape base or substrate and the adhesive is of the order of 0.002 to 0.005 inches and the diameter of the filament is of the order of 0.0025 to 0.005 inches so that the filament stands up from the adhesive and is not buried or implanted in the adhesive material. However the selection of the adhesive and the filament is such that it remains attached during the step of the method up to the pulling of the tape to cut the film.

The adhesive may be applied after the filament is laid on the tape substrate and thus covers over the filament providing an enhanced attachment where required.

The filament may carry a pre-applied adhesive or primer material which co-operates with the adhesive 35 providing an enhanced attachment where required.

An alternative construction can be provided which includes two substrate layers and laminated together by a laminating adhesive with the filament 16 captured between the layers and thus held in place. The layer carries on its rear surface the adhesive and the layer carries on its front surface the release coat. The laminating adhesive has to be such that it allows the filament to release from it. The filament could be treated to prevent becoming fixed to the adhesive if say the laminating adhesive was the cross linkable type. This is not an issue if pressure sensitive adhesive is used for the laminating adhesive.

The tape has a width in the range 0.060 to 0.500 inches and is preferably less than 0.25 inches.

The tape is extensible to a degree so as to allow bending to at least one side by extension along the opposite side. Thus the tape can bend to each side through any angle to take up a minimum inside radius of curvature of the order of 0.157 inches. This allows it to be bent or wrapped around elements on the vehicle such as door handles and other items previously described while the tape remains flat against the vehicle surface and attached to the vehicle surface by its layer of adhesive.

As shown the filament is spaced from both side edges to allow bending in both directions. As the filament is located in the middle as shown, the tape is symmetrical and will bend equally in each direction. Typically the filament is less extendible than the tape since longitudinal extension of the filament in the longitudinal direction is undesirable during the pulling action.

The adhesive thus acts to hold the filament in place on the tape during bending of the tape while the tape is applied to the surface and while the filament is being pulled to effect the cutting of the film.

The tape is formed of a plastics or filmic material allowing stretch of the tape greater than that of the filament and preferably the tape is formed of a PVC which has been found to provide the best characteristics of strength, co-operation with film adhesive, elongation and clean cutting of the film.

The arrangement of the present invention provides a tape system for cutting a film which includes the first tape 10 and the filament 16. The arrangement further provides a second tape 20 formed by a body of an extensible material having a front surface 21, a rear surface 22, a first longitudinal side edge 23 and a second longitudinal side edge 24. The second tape body has an adhesive 25 on the rear surface 22 for attachment to the film when applied over the first tape body so that the second tape body. The second tape body has a width greater than that of the first tape arranged such that the second tape body when applied over the film at the first tape body bridges to each side of the filament on the first tape body underneath the film. The film forming the second tape is arranged such that the filament when pulled tears through the second tape body along the length of the second tape body at its position at the second tape body spaced from both side edges. This has been found to provide an effective clean cutting action on the film with little or no jagged edges and little or no pulling of the film which can cause bunching.

As explained above, the filament 16 is attached to the first tape 10 at a position thereon spaced from both the first and second side edges which allows bending of the first tape body as indicated at 101, 102 while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge.

As explained previously, the filament 16 and the first tape 10 are arranged such that, with the rear surface of the first tape body attached to the object, the filament when pulled as indicated at P tears through the first tape body along the length of the first tape body at its position on the first tape body spaced from both side edges rather than pulling out from one side edge of the tape body.

As shown in FIG. 1, the filament 16 is located in the adhesive 12 on the rear surface of the tape 10. The adhesive is thus arranged to hold the filament in place on the first tape body during bending of the first tape body while the first tape body is applied to the surface and while the filament is being pulled to tear through the first tape body. As an alternative (not shown) the first tape body has a first substrate layer overlying and laminated by an adhesive to a second substrate layer and the longitudinally extending filament is located between the first and second substrate layers. This acts to better locate the filament and hold it in place.

In an alternative (not shown) the filament 16 is attached to the first tape 10 body at one of said first and second side edges.

Figure 2:
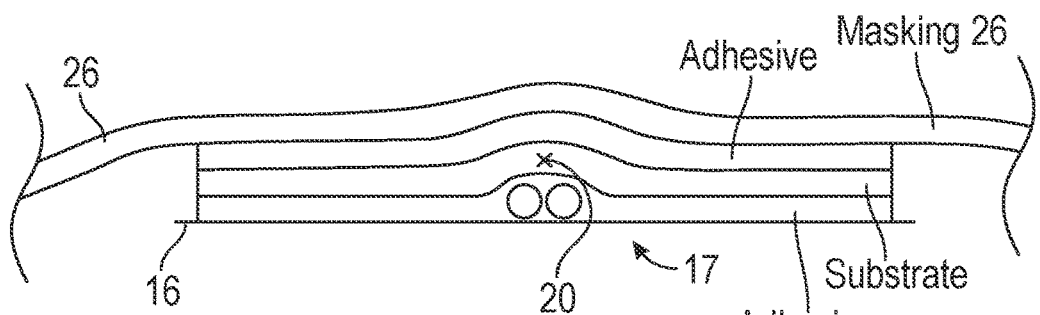
FIG. 2 is a front elevational view of a surface of an object to be covered vehicle showing film and the two tapes of the system.

As shown in FIG. 2, the second tape 20 has a length L so that an end 27 extends beyond the end 103 of the first tape 10 and beyond an edge 81 of the film 8 to engage the object and hold the film onto the object O.

The second tape 20 thus acts to apply a force to the film acting to reduce tendency of the film to pull away from the object during the cutting by the filament as the filament is pulled. It is also possible to apply the force by different methods such as by pressing an object such as a roller onto the film at the location where the pulling force P is applied.

The arrangement described above can also use two side by side filaments as described in detail hereinafter.

In FIGS. 1 to 6 is shown a tape 10 according to the present invention which includes a tape body or substrate 11 having a front surface 12, a rear surface 13, a first longitudinal side edge 14 and a second longitudinal side edge 14A. The tape body 11 has an adhesive 15 covering the rear surface 13 for attachment of the tape body to the surface 16 of an object 17 to be coated. The tape body 11 has first and second longitudinally extending filaments 18, 19 attached thereto. In this embodiment, the filaments are applied onto or into the layer 15 so as to be held on the surface 13.

The first and second filaments 18, 19 are attached to the tape body 11 at a position thereon spaced from both side edges of the tape, that is at or adjacent a center line 20. The width of the tape and the spacing of the filaments to a distance D from the side edge allows bending of the tape in a first side to side direction 21 by extension of the tape along the second longitudinal side edge 15 and in a second side to side direction 22 by extension of the tape along the first longitudinal side edge 14. The first and second filaments are preferably substantially immediately side by side at the centerline 20.

On top of the front surface 12 of the tape body 11 is provided a layer 23 of an adhesive which is in turn covered by a release sheet 24 of a conventional construction. The release sheet allows the tape to be rolled into a supply length without interference between the adhesive 23 and the adhesive 15.

The steps in the process are shown in FIGS. 1 to 6.

Figure 3:
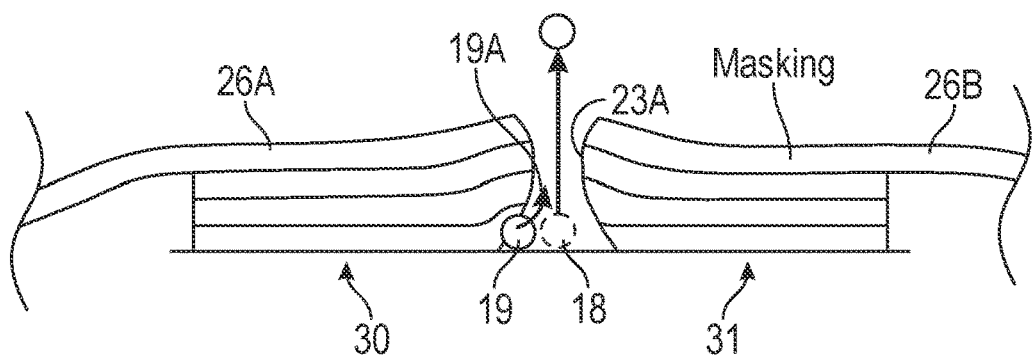
Figure 4:
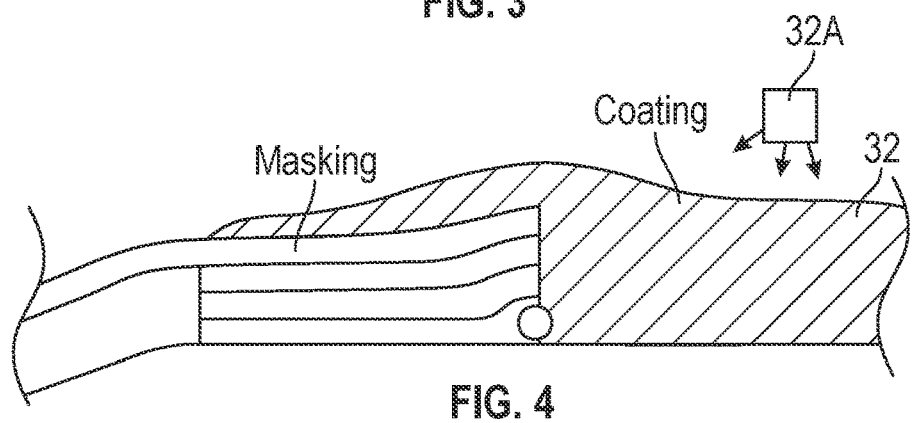

In FIG. 3 the first filament 18 is pulled. The strength of first and second filaments 18, 19 is arranged relative to the tear strength of the tape such that the first filament 18 when pulled tears through the tape body 11 to form a slot 23A which divides the tape body into two separate longitudinally extending, side by side pieces 30, 31. As the filament 18 is on the rear of the substrate 11 and the substrate is adhesively attached to the surface, the filament 18 must tear through the substrate 11 in order to escape and thus forms the slot.

Thus, pulling the first filament 18 so that the first filament 18 tears through the tape body 11 to form the slot 23A acts to divide the tape body 11 into first and second separate longitudinally extending, side by side pieces 30 and 31 with each remaining in place adhesively attached to the surface 16.

As described above the tape can be used with self-adhesive film where no masking sheet is required. In this case, after the filament 18 is pulled out, the first piece 31 of the tape body on the side of the slot opposite the second filament 19 is removed from the surface 16 exposing the surface at that location on the side of the slot 23A.

When used for coating, a masking sheet 26 is provided for application over the tape 10 and onto the surface 16 on both sides of the tape 10. The masking sheet can be self-adhesive so as to attach to the surface 16 and the exposed surface 12 of the tape body 11. However preferably the adhesive 23 is provided to ensure a proper adhesive attachment. In FIG. 2 the masking sheet 26 is applied. Also the first filament 18 tears through the masking sheet 26 to form sheet pieces 26A and 26B.

After the filament 18 is pulled out, the portion 26B of the masking sheet 26 and the first piece 31 of the tape body on the side of the slot opposite the second filament 19 is removed from the surface 16 exposing the surface at that location on the side of the slot 23A.

A coating or film 32 is applied using conventional application methods schematically indicated at 32A to the surface 16 up to and beyond the slot 23A so that a part of the coating 32 extends over the slot 23A onto the masking sheet portion 26A if used or over the tape piece onto the surface when no masking is used.

Figure 5:
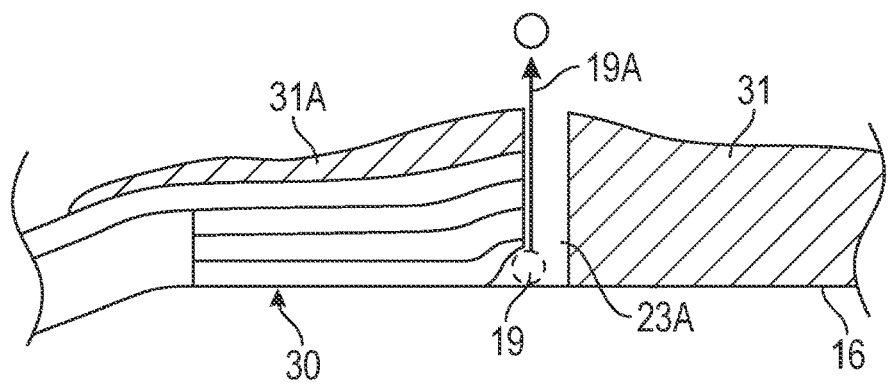
Figure 6:
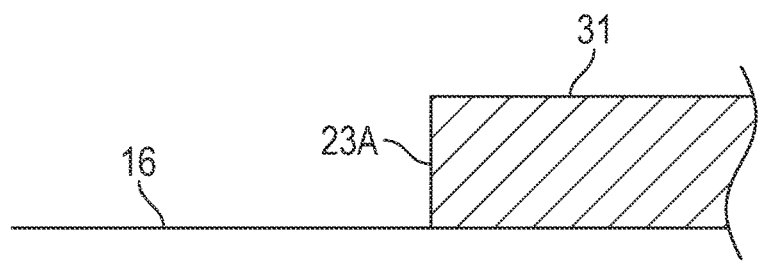

After the coating is completed and cured or the film is applied, the second filament 19 is pulled as indicated at 19A through the slot 23A to cut the coating 32 or film at the slot leaving that part attached to the surface 16 and a part 31A applied over the masking sheet if used. After the coating or film is cut, as shown in FIGS. 5 and 6, that part 31A of the masking sheet can be removed with removing the second piece 30 of the tape body and the masking sheet 26A to leave the coating 31 on the surface 16 up to a clean cut edge defined by the slot 23A.

The first and second filaments 18, 19 are arranged such that the second filament when pulled passes through the slot. That is the filament 19 is closely adjacent the center line so that it does not tear the tape body 11 but instead escapes from the edge of the tape body now generated at the slot 23A.

The adhesive 23 is preferably applied onto the tape body across the whole of the front surface 12. However it will be appreciated that the removal of the piece 31 provide the possibility that this part has no adhesive since it is not required to hold the masking sheet in place during the coating action.

The adhesive 15 has the characteristic that the tape body can be pulled from a surface 16 of the object without leaving an adhesive residue and without damaging the surface.

In order to control the bending action to contour the tape during application, the filaments are generally less extendible than the tape body so that the tape body extends on that side of the filaments necessary to provide the convex side of a curve.

Figure 7:
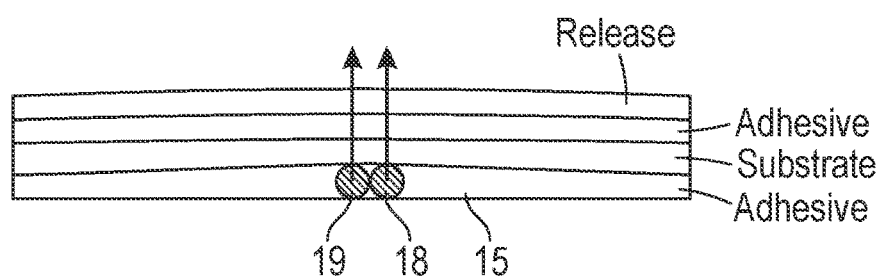
FIGS. 7 to 10 show similar cross-sectional views of alternative embodiments.
Figure 8:
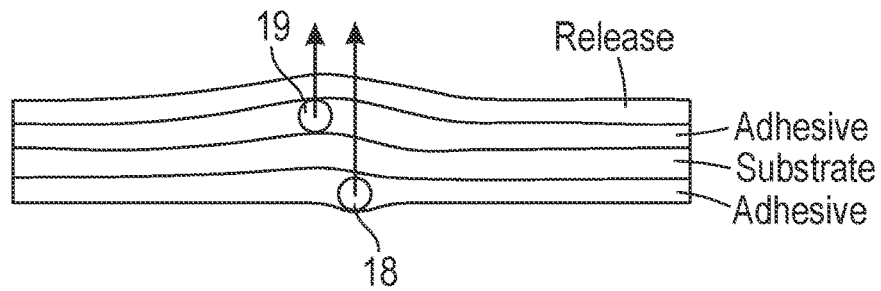

As shown in FIG. 7, the filaments 18, 19 are both buried within the adhesive 15. As shown in FIG. 8 the first filament 18 is carried in or on the adhesive 15 on the rear surface and the second filament 19 is on the side 12 of the tape body opposite to the first filament 18.

The tape body can preferably consist of a single layer or substrate 11, but more complex arrangements can be provided by laminates.

The tape body carries only the first and second filaments 18, 19 since only these are required for the cutting action. Additional filaments can interfere with the extension of the tape which is necessary for the curvatures.

Figure 9:
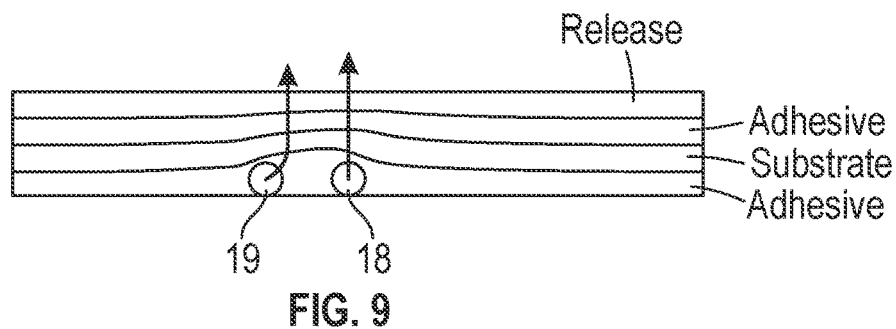

In FIG. 7 the first and second filaments are located substantially at a center line of the tape body. However as shown in FIG. 9, the filament 19 may be spaced from the filament 18 by a distance provided that when pulled its escapes through the slot 23A rather than tearing the tape.

The filament 19 may require greater strength to tear the coating and thus the filament 18 may be of a thinner or weaker gauge.

Figure 10:
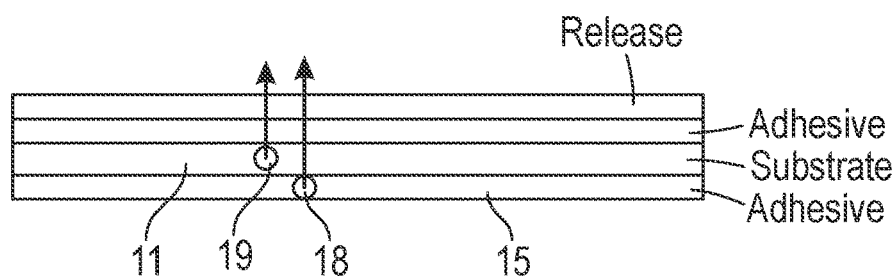

In FIG. 10, the filament 18 is coextruded with the layer 15 and the filament 19 is coextruded with the tape substrate 11. Other arrangements are possible of the layers and filaments provided that the filament 18 acts to tear the slot 23A and the filament 19 follows through the slot and acts to cut the coating.

Figure 11:
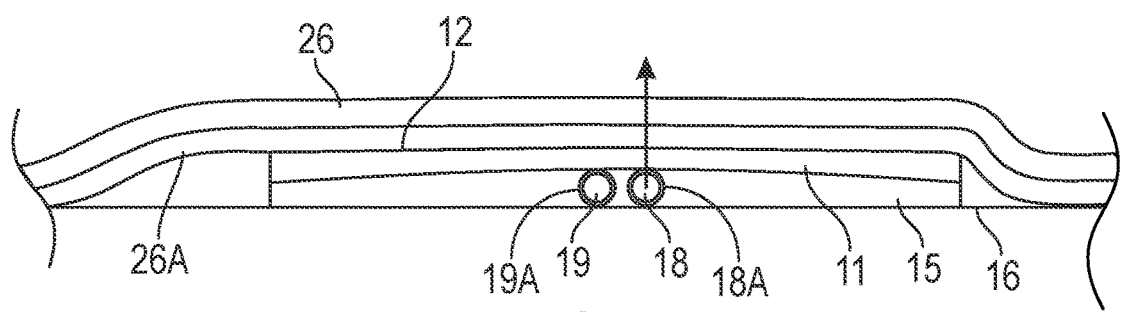
FIGS. 11 and 12 show a further alternative embodiment where the masking sheet is adhesive so that the tape has no adhesive.
Figure 12:
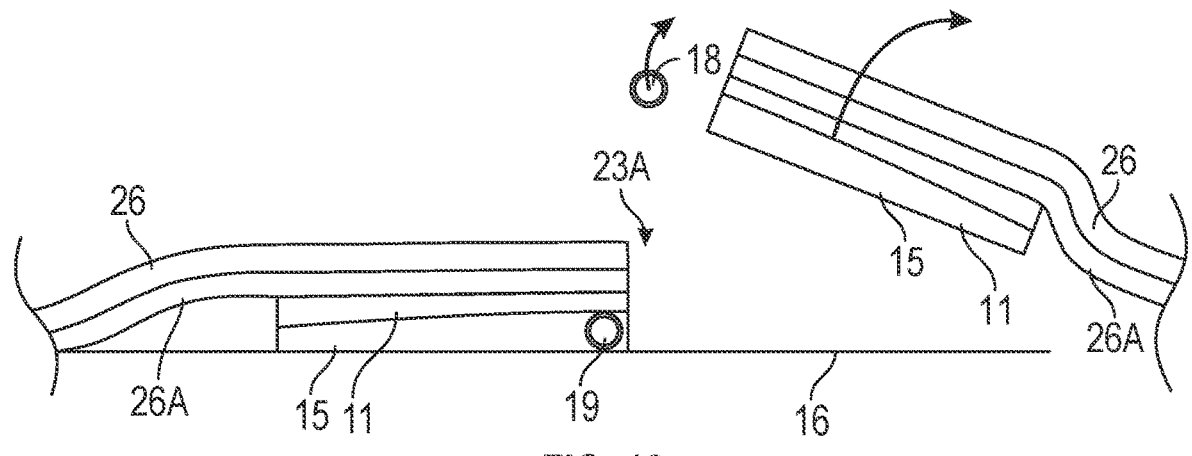

Turning now to FIGS. 11 and 12, the masking sheet 26 is adhesive and includes an adhesive layer 26A for attachment to the surface 16 and to the front surface 12 of the tape 11. Thus the tape 11 is free from adhesive on the front surface 12 but the surface is arranged such that it has no release coat which would prevent the adhesion of the masking sheet to the tape.

In this arrangement, there is no need to carefully apply the edge of the masking sheet to the tape since the masking sheet is intended in the initial step to bridge over the tape and adhere to the surface 16 on both sides of the tape. However the sheet can terminate on the tape.

As explained previously, the first filament 18 is then pulled through the tape to form the slot 23A while the filament 19 remains in place. For this purpose it is only necessary that the filament 19 be located as close to the filament 18 that it pulls around the edge of the tape 11 at the slot 23A rather than tearing through the tape 11.

One or both of the first and second filaments have a coating 18A, 19A thereon which is arranged by its properties to prevent the filaments from adhesively connecting together when the first filament 18 is pulled. Thus the coatings can provide a greater level of adhesion of the filament 19 to the adhesive 15 than that of the filament 18 allowing the latter to be easily pulled while the former remains in place. The coatings may also prevent adhesion of the two filaments one to the other so that there is a reduced tendency for the filament 19 to pull out with the filament 18. With a suitable selection of the adhesion properties, the filaments can lie directly side by side; but a spacing may be preferred to remove any tendency of the filament 19 to escape with the filament 18 while the spacing is sufficiently small to allow the filament 19 to escape around the edge of the tape at the slot without damaging the edge of the coating as it is cut to make a clean cut edge.

Typically the second filament 19 is stronger than the first 18 as it is required to cut through a typically tough applied coating while the filament 18 is required to cut through only the tape 11 and a thin masking material.

The invention claimed is:

1. A tape comprising:
   a tape body having a front surface, a rear surface, a first longitudinal side edge and a second longitudinal side edge;
   the tape body having an adhesive on the rear surface for attachment to an object;
   the tape body having a first and a second longitudinally extending filaments attached thereto, wherein the first and second filaments are arranged such that the second filament when pulled passes through a slot formed by pulling the first filament through the tape body;
   wherein the first and second filaments are attached to the tape body at a position thereon spaced from both side edges of the tape to a distance which allows bending of the tape in a first side to side direction by extension of the tape along the second longitudinal side edge and in a second side to side direction by extension of the tape along the first longitudinal side edge.

2. The tape according to claim 1 wherein the first and second filaments are side by side.

3. The tape according to claim 1 wherein the first and second filaments are arranged such that the first filament when pulled tears through the tape body to form the slot which divides the tape body into two separate longitudinally extending, side by side pieces.

4. The tape according to claim 1 wherein the tape body has an adhesive on at least part of the width of the front surface thereof on a side of the first filament adjacent the second filament.

5. The tape according to claim 1 wherein the filament and the tape body are arranged such that, with the rear surface attached to the object, the first filament when pulled is pulled from the tape body along the length of the tape body at its position thereon rather than pulling out from one side edge of the tape body.

6. The tape according to claim 1 wherein the adhesive has the characteristic that the tape body can be pulled from a surface of the object without leaving an adhesive residue and without damaging the surface.

7. The tape according to claim 1 wherein the filaments are less extendible than the tape body.

8. The tape according to claim 1 wherein the first and second filaments are carried in or on the adhesive on the rear surface.

\* \* \* \* \*